(12) United States Patent
Samuels

(10) Patent No.: US 7,226,059 B1
(45) Date of Patent: Jun. 5, 2007

(54) ADAPTABLE TRANSPORT CART FOR USE WITH STROLLERS AND THE LIKE

(75) Inventor: Semeka Samuels, 3110 Nectar Dr., Power Springs, GA (US) 30127

(73) Assignee: Semeka Samuels, Powder Springs, GA (US)

(*) Notice: Subject to any disclaimer, the term of this patent is extended or adjusted under 35 U.S.C. 154(b) by 0 days.

(21) Appl. No.: 11/530,217

(22) Filed: Sep. 8, 2006

Related U.S. Application Data

(60) Provisional application No. 60/715,127, filed on Sep. 9, 2005.

(51) Int. Cl.
*B62B 3/02* (2006.01)
(52) U.S. Cl. .......................... 280/33.992; 280/33.991; 280/33.993; 280/33.999; 280/47.38; 280/47.23
(58) Field of Classification Search ........... 280/33.992, 280/33.991, 33.993, 33.999, 47.38, 47.23
See application file for complete search history.

(56) References Cited

U.S. PATENT DOCUMENTS

| | | | |
|---|---|---|---|
| 4,923,208 A | 5/1990 | Takahashi et al. | |
| 5,312,122 A * | 5/1994 | Doty | 280/33.992 |
| 5,722,594 A | 3/1998 | Farr et al. | |
| 6,170,854 B1 | 1/2001 | Maher et al. | |
| 6,572,122 B2 * | 6/2003 | Johnson et al. | 280/33.993 |
| 6,575,480 B2 * | 6/2003 | McKelvey | 280/33.993 |
| 6,702,313 B2 * | 3/2004 | Forshee et al. | 280/304.1 |
| 6,979,004 B2 * | 12/2005 | Otterlee et al. | 280/33.993 |
| 7,093,841 B2 * | 8/2006 | Conrad | 280/33.993 |

* cited by examiner

*Primary Examiner*—Christopher P. Ellis
*Assistant Examiner*—Cynthia F. Collado

(57) ABSTRACT

A cart includes a frame and a rigid base section horizontally registered above a ground level and oriented parallel thereto. Casters are mated to opposed corners of the base section. An upper section is pivotally conjoined to opposed corners of the base section and is offset along a vertical plane. The upper section is spaced from the casters. A collection bin is centrally housed within the upper section and seated on the base section. The bin is arranged so that the upper section abuts proximal and distal top ends of the bin. Clamping arms are anchored to a distal end of the base section and spaced from the upper section respectively. The upper section and the clamping arms are simultaneously and independently articulated during operating conditions.

15 Claims, 7 Drawing Sheets

ADAPTABLE TRANSPORT CART FOR USE WITH STROLLERS AND THE LIKE

CROSS REFERENCE TO RELATED APPLICATIONS

This application claims the benefit of U.S. Provisional Application No. 60/715,127, filed Sep. 9, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to transportation carts and, more particularly, to an adaptable transport cart for use with strollers and the like for assisting a caregiver to simultaneously maneuver a baby stroller while carrying a variety of objects within the cart during operating conditions.

2. Prior Art

Parents of infants and young children frequently desire a wheeled child carrier or stroller on which the child can be seated to permit the parents to push the stroller and the child when the parents are walking. Such child strollers are widely used by parents during various activities. Among such activities is shopping. Reaching a store or shopping center often requires traveling by automobile. This necessitates the transporting of the child stroller in the automobile. Consequently, collapsible child strollers are popular. When shopping, the parents frequently accumulate a significant number of packages which require transporting, either back to the automobile or directly to the home or other location. Since properly controlling the child stroller requires the use of two hands, it is difficult, if not impossible, for one parent to both control the child stroller and to carry the packages. Although there are wheeled package carriers available, they generally are not collapsible for transporting in an automobile. In addition, it is not possible for one parent to both control a child stroller and control a wheeled package carrier. Further, such wheeled package carriers generally do not protect the packages from the weather.

Once a child is able to walk, the child can, and often prefers to, walk for some distance even when a child stroller is available. Thus, it is possible to use the child stroller for the carrying of packages, with the child walking and holding on either to the child stroller or to the parent. However, the child stroller, being designed for a child to sit on it, has a maximum weight carrying capacity of about 40 pounds and a limited ability to hold bulky packages. Consequently, the child stroller has limited ability to carry large, heavy packages. In addition, often people without children desire a package carrier when shopping. Many such people, for example, grandparents or other relatives of a child, find it desirable to have available a child stroller even though they do not use it every day, since they desire to have it available for when a grandchild or other young relative or friend visits.

One prior art example shows a convertible child stroller/package carrier having a wheeled frame, a child seat which can be removably fastened to the frame to provide a child stroller, and a package holder which likewise can be removably fastened to the wheeled frame to provide a package carrier. The wheeled frame ordinarily has four legs, with a wheel assembly on each. Two additional legs with wheel assemblies can be attached on the rear of the wheeled frame to provide additional stability when carrying heavy packages. The wheeled frame is preferably hinged to permit folding of the child stroller/package carrier for ease of transporting, either by carrying by hand or by placement in an automobile or other vehicle. The package holder is preferably a weather resistant bag or a mesh bag and is preferably provided with a drawstring for closing of the bag when the package carrier is removed from the wheeled frame. Unfortunately, this example requires switching out of the seat for the bag as necessary, which can be difficult and time consuming.

Another prior art example shows a convertible stroller and shopping vehicle having a stroller portion and a shopping vehicle portion. The stroller portion includes a seat which is movable from a deployed position to a stowed position. In the deployed position, the invention is used as a stroller. The shopping vehicle portion includes a collapsible receptacle that can be oriented in one of two orientations. In an open orientation, the receptacle creates a shopping cart while in a collapsed orientation the invention can be used to transport bulk materials. Unfortunately, this example does not provide a suitable seating area for a child when not being used as a shopping cart.

Accordingly, a need remains for an adaptable transport cart for use with strollers and the like in order to overcome the above-noted shortcomings. The present invention satisfies such a need by providing an assembly that is simple and easy to use, is lightweight yet durable in design, and assists a caregiver to simultaneously maneuver a baby stroller while carrying a variety of objects within the cart. Such an assembly conveniently provides ample storage in which a wide variety of personal items can be neatly and easily stored. The assembly can effectively hold grocery items as well as luggage, and advantageously folds flat against an existing stroller, thus conveniently offering compact and convenient storage between uses.

BRIEF SUMMARY OF THE INVENTION

In view of the foregoing background, it is therefore an object of the present invention to provide an apparatus for an adaptable transport cart for use with strollers and the like. These and other objects, features, and advantages of the invention are provided by a cargo-transporting cart for assisting a caregiver to simultaneously maneuver a baby stroller while carrying a variety of objects within said cart during operating conditions.

The assembly includes a frame having a rigid base section horizontally registered above a ground level and advantageously oriented parallel thereto. Such a base section includes first and second pairs of elongated shafts extending along longitudinal and latitudinal edges of the frame. A plurality of brackets are conveniently seated at the opposed corners of the base section. Each of such brackets is directly and permanently mated to corresponding ones of the first and second pairs of shafts such that the first and second pairs of shafts effectively defines a perimeter of the base section. A plurality of support rods crisscross along a center of the base section and are directly mated to the first and second pairs of shafts respectively. Such support rods are spaced from the brackets. A plurality of casters are permanently mated directly to opposed corners of such a base section.

The assembly further includes an upper section pivotally conjoined directly to such opposed corners of the base section. Such a collapsible upper section is manually offset along a vertical plane such that the upper section advantageously becomes adapted between collapsed and raised positions while the base section effectively maintains a static spatial relationship with the ground level. The upper section advantageously lays substantially parallel to the base section when the upper section is articulated to the collapsed position. The upper section is effectively spaced from the casters.

The upper section includes first and second substantially L-shaped levers directly and statically coupled to distal ones of the brackets respectively. First and second telescopically adaptable tubular beams have lower ends directly and pivotally mated to the first and second levers. Such first and second beams travel proximally and upwardly along opposed edges of the frame when the upper section is adapted to the raised position.

The upper section further includes a substantially U-shaped handle having laterally opposed ends telescopically and pivotally conjoined directly to upper ends of the first and second beams respectively. Such a handle is selectively articulated along a second arcuate path traveling along a longitudinal length of the frame such that the handle conveniently folds over a proximal end of the upper frame and becomes distally positioned away from an unfolded position.

The assembly further includes a collection bin centrally housed within the upper section and seated directly on the base section. Such a bin is conveniently arranged in such a manner that the upper section directly abuts proximal and distal top ends of the bin so that the bin effectively remains statically anchored on the base section during transport. A U-shaped pole having laterally opposed ends is directly mated to proximal ones of the brackets. Such a pole travels distally and upwardly from a proximal end of the frame. A distal end of the pole wraps about the distal top end of the bin so that the bin is effectively prohibited from being displaced beyond a distal end of the upper section.

The assembly further includes a plurality of clamping arms directly anchored to a distal end of the base section and effectively spaced from the upper section respectively. Such clamping arms are hingedly pivotal along a first arcuate path such that distal ends of the clamping arms advantageously rise and fall above the horizontal plane of the base section. Each of the clamping arms includes a bracket directly connected to the distal end of the base section. A telescopic shaft has a proximal end pivotally coupled to the bracket and a C-shaped clamp directly and statically coupled to a distal end of the shaft. Such a clamp is removably attached to the baby stroller in such a manner that the baby stroller advantageously maintains a fixed spatial relationship with the cart during operating conditions. The upper section and the clamping arms are simultaneously and independently articulated during transport.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself however, both as to its organization and method of operation, together with further objects and advantages thereof, may best be understood by reference to the following description taken in connection with the accompanying drawings in which:

DETAILED DESCRIPTION OF THE INVENTION

Figure 1:
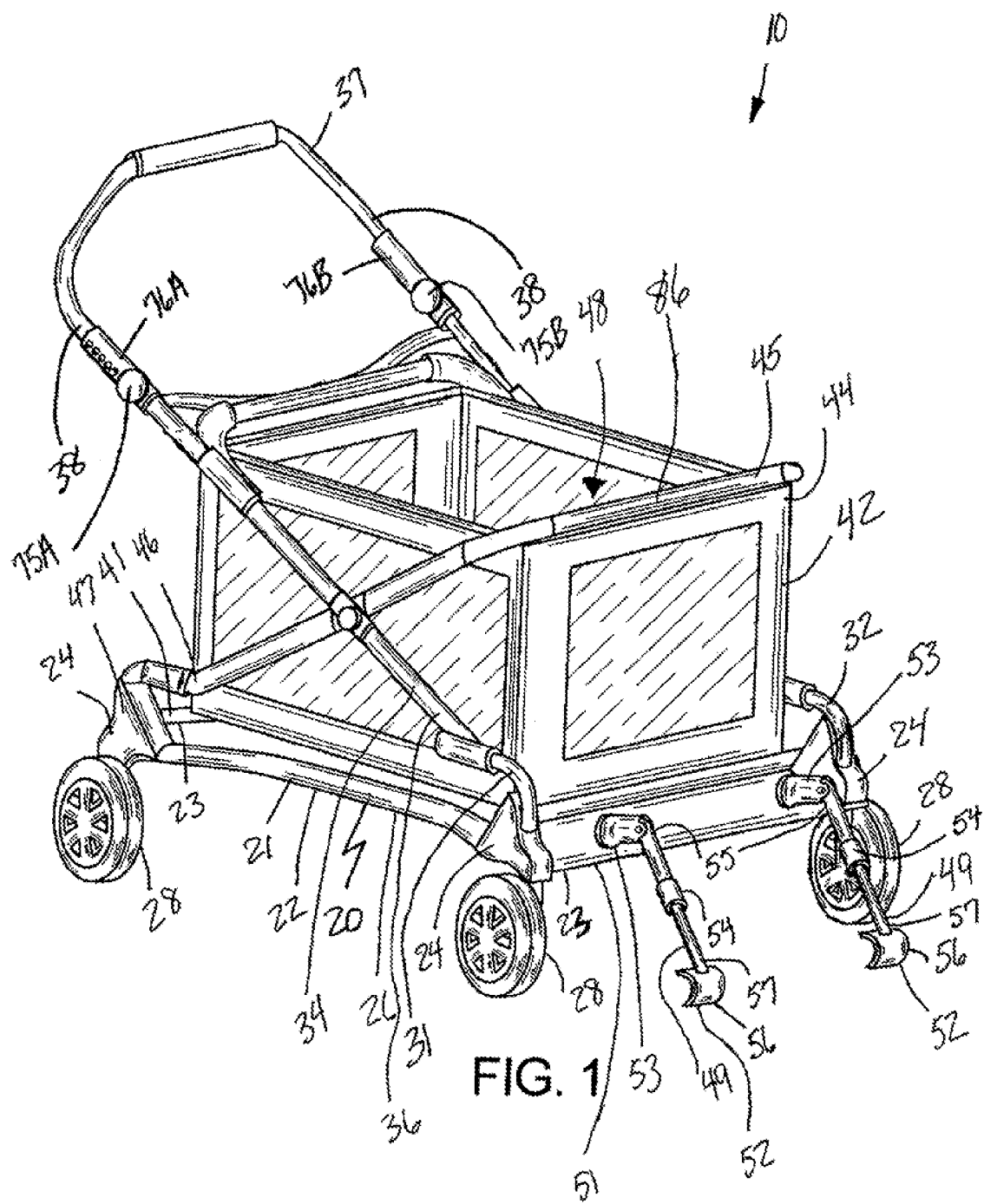
FIG. 1 is a perspective view of an adaptable transport cart for use with strollers and the like, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–9 by the reference numeral 10 and is intended to provide an adaptable transport cart for use with strollers and the like. It should be understood that the assembly 10 may be used with many different types of strollers and to transport many different types of objects, and should not be limited in use to only those strollers and objects described herein.

Referring initially to FIGS. 1, 2, 4 and 5, the assembly 10 includes a frame 20 having a rigid base section 21 horizontally registered above a ground level and advantageously oriented parallel thereto. Such a base section 21 includes first 22 and second 23 pairs of elongated shafts extending along longitudinal and latitudinal edges of the frame 20. A plurality of brackets 24 are critically seated at the opposed corners of the base section 21 for stabilizing the weight of the frame 20 while attached to an existing stroller. Each of such brackets 24 are directly and permanently mated, without the use of intervening elements, to corresponding ones of the first and second pairs of shafts 22, 23, which is essential such that the first and second pairs of shafts 22, 23 effectively defines a perimeter 26 of the base section 21.

A plurality of support rods 27 crisscross along a center of the base section 21 and are directly mated to the first and second pairs of shafts 22, 23 respectively, without the use of intervening elements. Such support rods 27 are necessarily spaced from the brackets 24, which overcomes prior art shortcomings of rocking the frame along uneven terrain. By spacing the support rods 27 from the brackets 24, drive forces are absorbed in the brackets 24 and are not transferred to the support rods 27. A plurality of casters 28 are permanently mated directly to the opposed corners of the base section 21 without the use of intervening elements. Of course, such casters 28 can be produced in a variety of sizes, as is obvious to a person of ordinary skill in the art.

Again referring to FIGS. 1, 2, 4 and 5, the assembly 10 further includes an upper section 29 pivotally conjoined directly to the opposed corners of the base section 21 without the use of intervening elements. Such a collapsible upper section 29 is manually offset along a vertical plane such that the upper section 29 advantageously becomes adapted between collapsed and raised positions while the base section 21 effectively maintains a static spatial relationship with the ground level. The upper section 29 advantageously lays substantially parallel to the base section 21 when the upper section 29 is articulated to the collapsed position. The upper section 29 is effectively spaced from the casters 28 for limiting drive forces absorbed during operating conditions.

Figure 2:
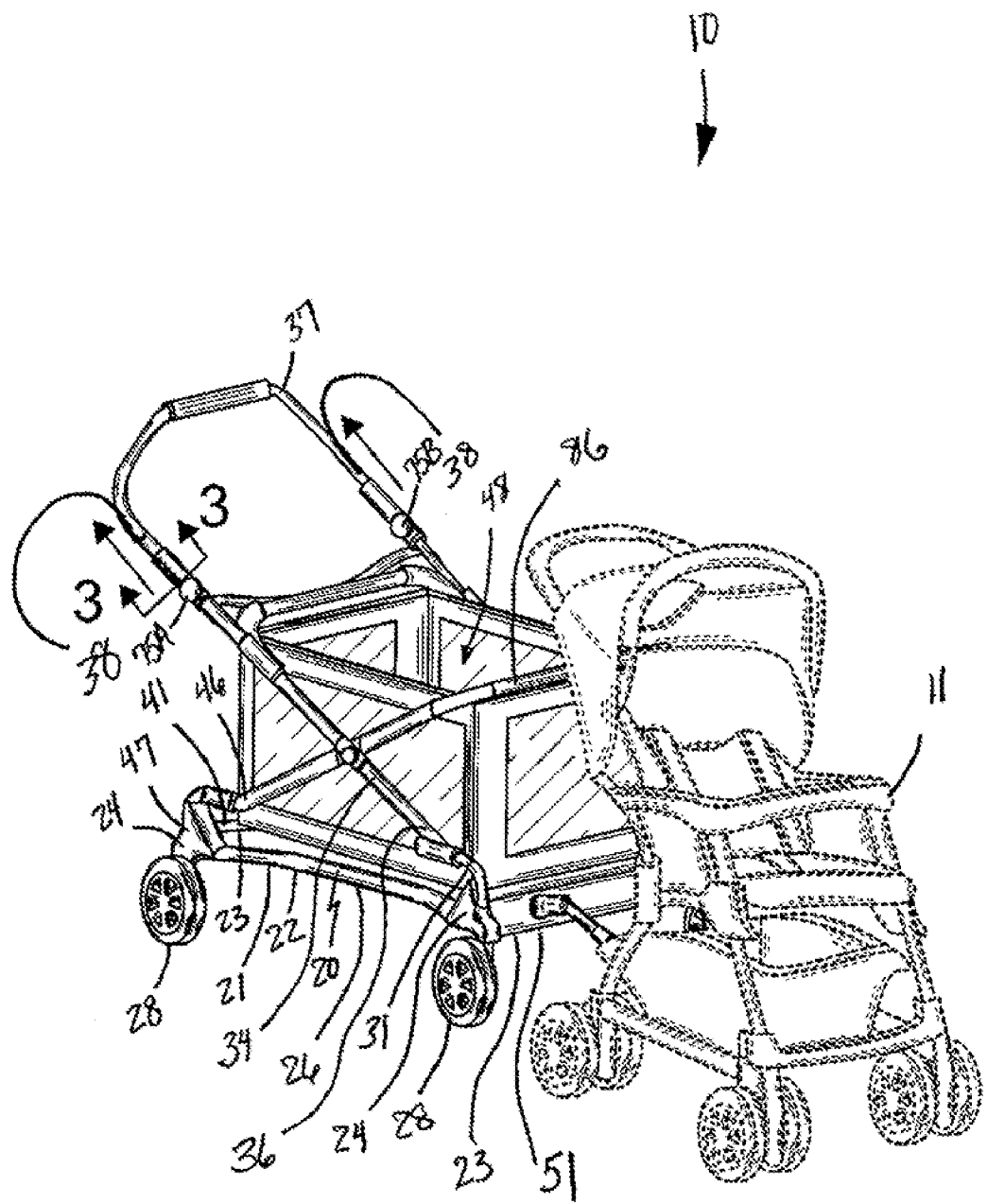
FIG. 2 is perspective view of the assembly shown in FIG. 1 showing the assembly attached to a stroller.

Referring to FIGS. 1, 2; 4, 5, 8 and 9, the upper section 29 includes first 31 and second 32 substantially L-shaped levers directly and statically coupled, without the use of intervening elements, to distal ones of the brackets 24. First 34 and second 35 telescopically adaptable tubular beams have lower ends 36 directly and pivotally mated, without the use of intervening elements, to the first and second levers 31, 32. Such first and second beams 34, 35 travel proximally and upwardly along opposed edges of the frame 20 when the upper section 29 is adapted to the raised position.

Again referring to FIGS. 1, 2, 4, 5, 8 and 9, the upper section 29 further includes a substantially U-shaped handle 37 having laterally opposed ends 38 telescopically and pivotally conjoined directly, without the use of intervening elements, to upper ends 39 of the first and second beams 34, 35 respectively. Such a handle 37 is selectively articulated along a second arcuate path traveling along a longitudinal length of the frame 20, which is critical such that the handle 37 conveniently folds over a proximal end 41 of the frame 20 and becomes distally positioned away from an unfolded position. The folding handle 37 thereby provides an unexpected benefit, thus overcoming prior art shortcomings.

Referring to FIGS. 1 and 2, the assembly 10 further includes a collection bin 42 centrally housed within the upper section 29 and seated directly on the base section 21, without the use of intervening elements. Such a bin 42 is conveniently arranged in such a manner that the upper section 29 directly abuts proximal 43 and distal 44 top ends of the bin 42, without the use of intervening elements, which is critical such that the bin 42 effectively remains statically anchored on the base section 21 during transport.

A U-shaped pole 45 having laterally opposed ends 46 is directly mated, without the use of intervening elements, to proximal ones 47 of the brackets 24. Such a pole 45 travels distally and upwardly from the proximal end 41 of the frame 20. A distal end 86 of the pole 45 wraps about the distal top end 44 of the bin 42, which is vital such that the bin 42 is effectively prohibited from being displaced beyond a distal end 48 of the upper section 29. Of course, such a bin 42 can be produced in a variety of sizes, as is obvious to a person of ordinary skill in the art.

Again referring to FIGS. 1, 2, 4, 5 and 6, the assembly 10 further includes a plurality of clamping arms 49 directly anchored, without the use of intervening elements, to a distal end 51 of the base section 21 and effectively spaced from the upper section 29 respectively. Such clamping arms 49 are hingedly pivotal along a first arcuate path, which is essential such that distal ends 52 of the clamping arms 49 advantageously rises and falls above the horizontal plane of the base section 21. Each of the clamping arms 49 includes a bracket 53 directly connected to the distal end 51 of the base section 21 without the use of intervening elements. A telescopic shaft 54 has a proximal end 55 pivotally coupled to the bracket 53 and a C-shaped clamp 56 directly and statically coupled to a distal end 57 of the shaft 54, without the use of intervening elements. Such a C-shaped clamp 56 is removably attached to the baby stroller in such a manner that the baby stroller 11 advantageously maintains a fixed spatial relationship with the assembly 10 during operating conditions. The upper section 29 and the clamping arms 49 are simultaneously and independently articulated during operating conditions.

Figure 3:
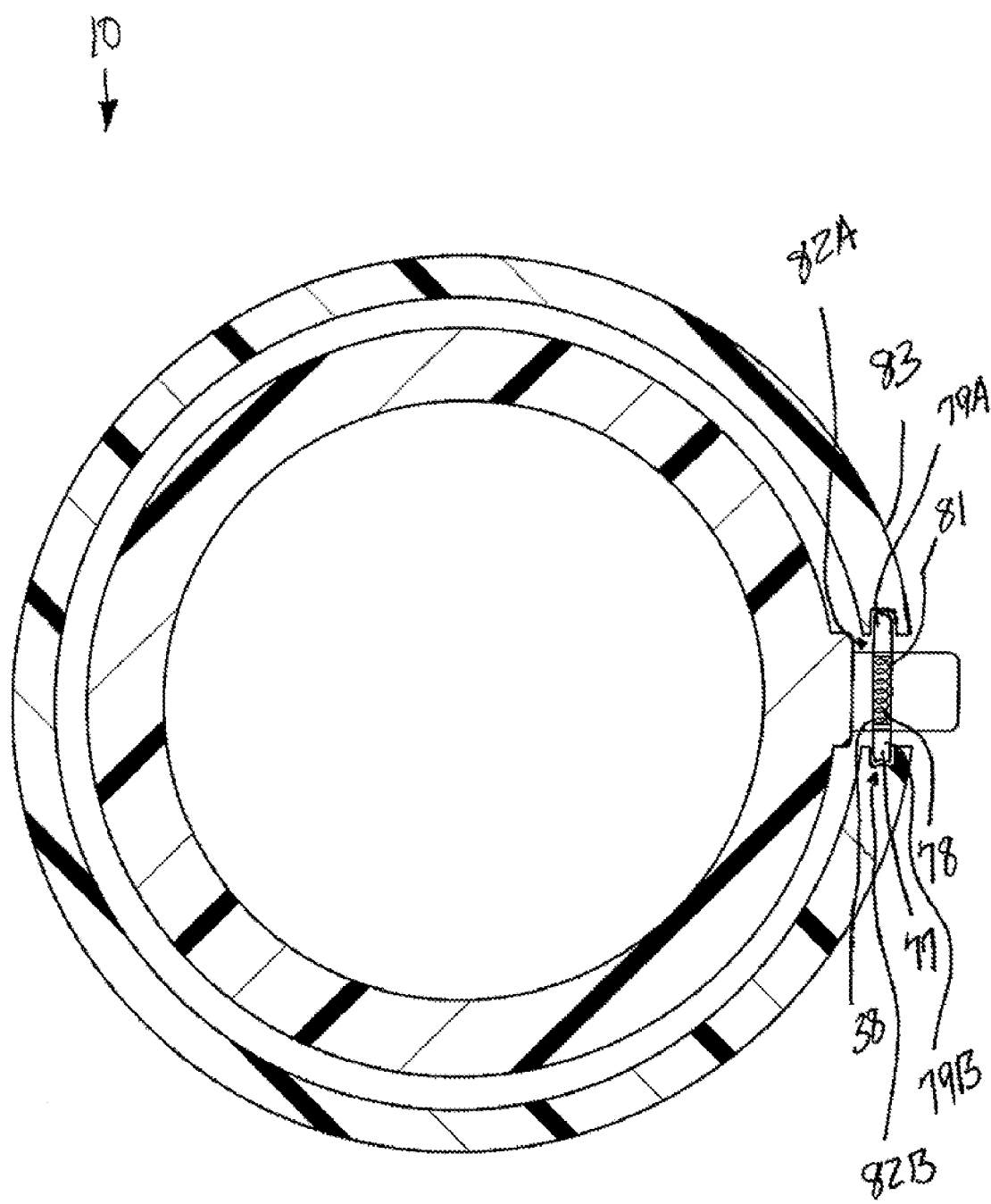
FIG. 3 is a cross sectional view of the detent shown in FIG. 2, taken along line 3—3.
Figure 4:
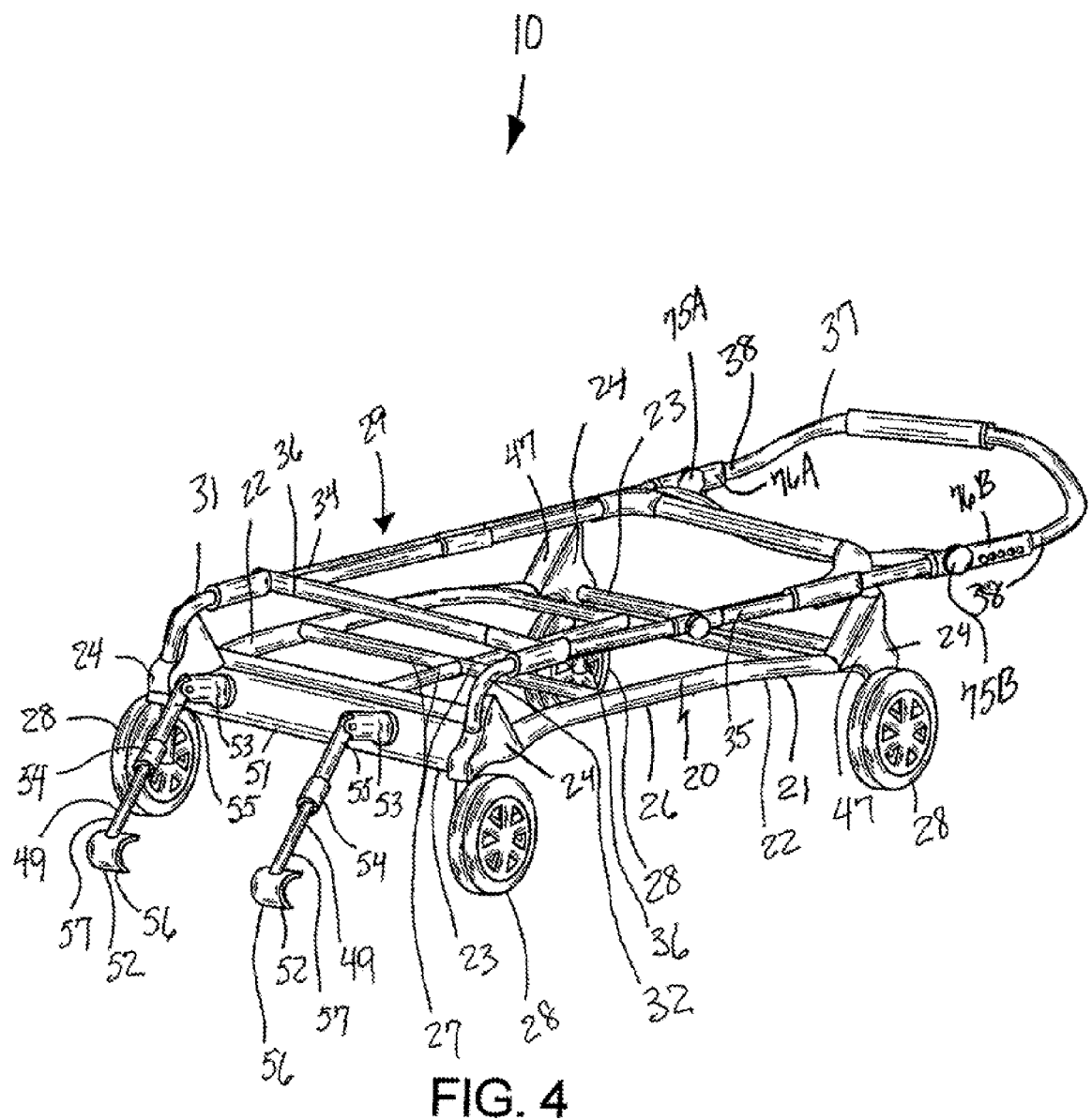
FIG. 4 is a perspective view of the assembly shown in FIG. 1 showing the frame in a collapsed position.
Figure 5:
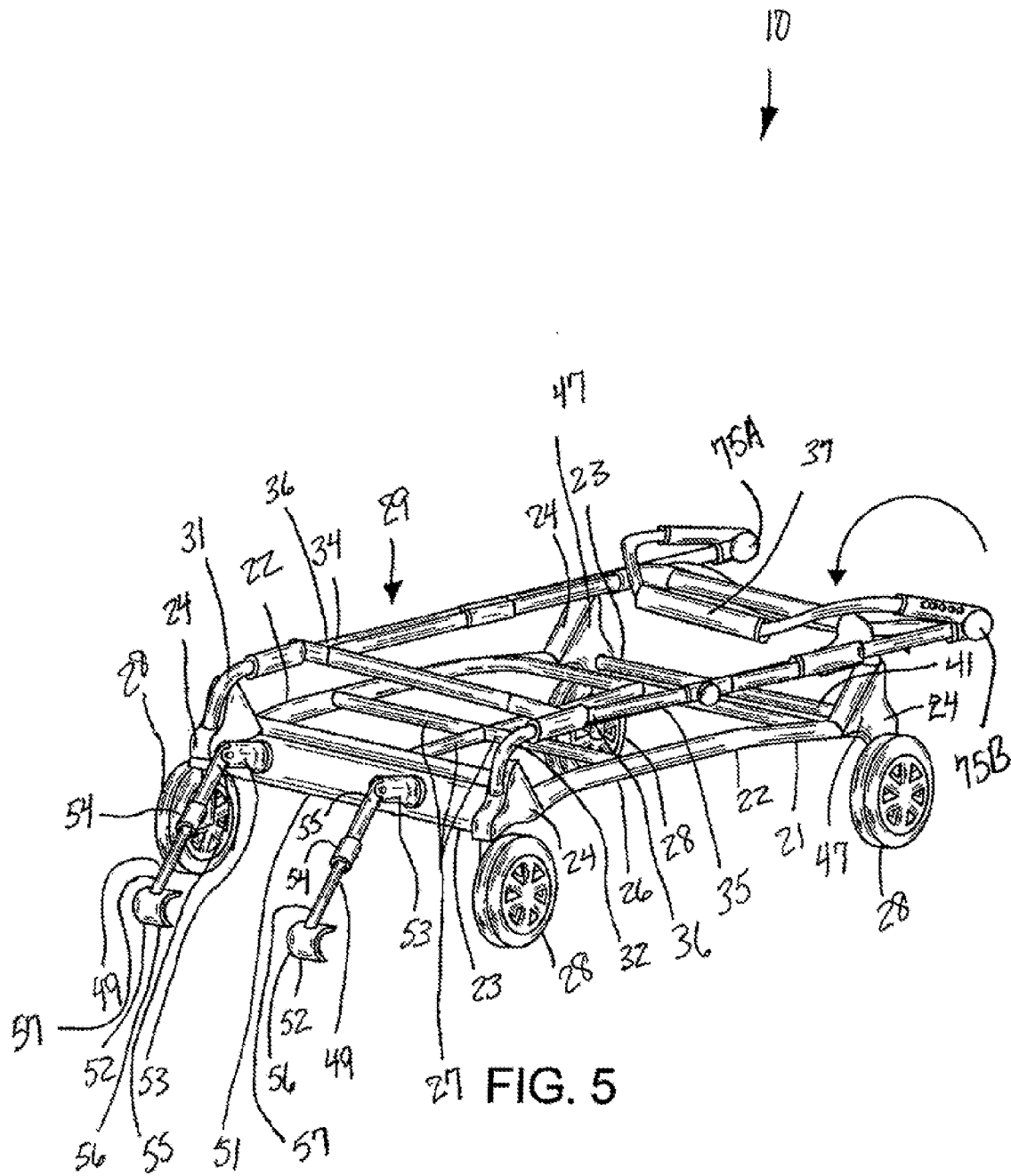
FIG. 5 is a perspective view of the assembly shown in FIG. 4 showing the handle articulated toward the distal end of the frame.
Figure 6:
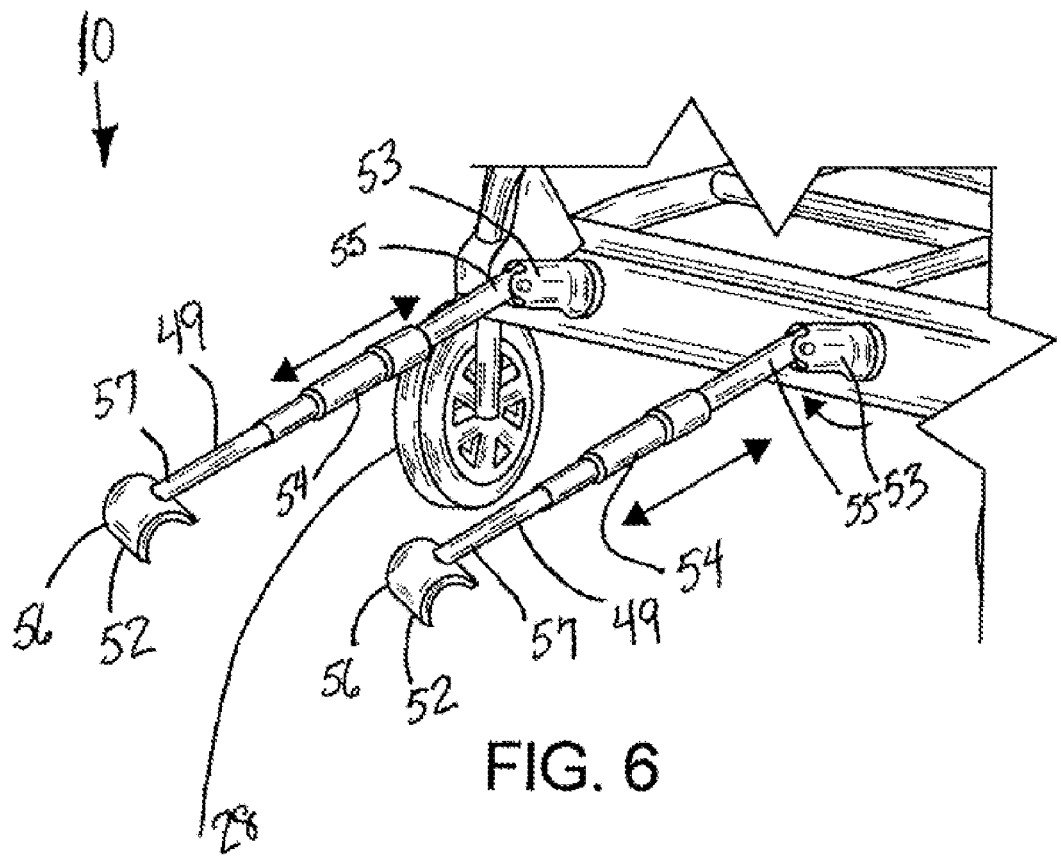
FIG. 6 is an expanded view of the clamping arms shown in FIG. 5 showing the clamping arms in an extended position.
Figure 7:
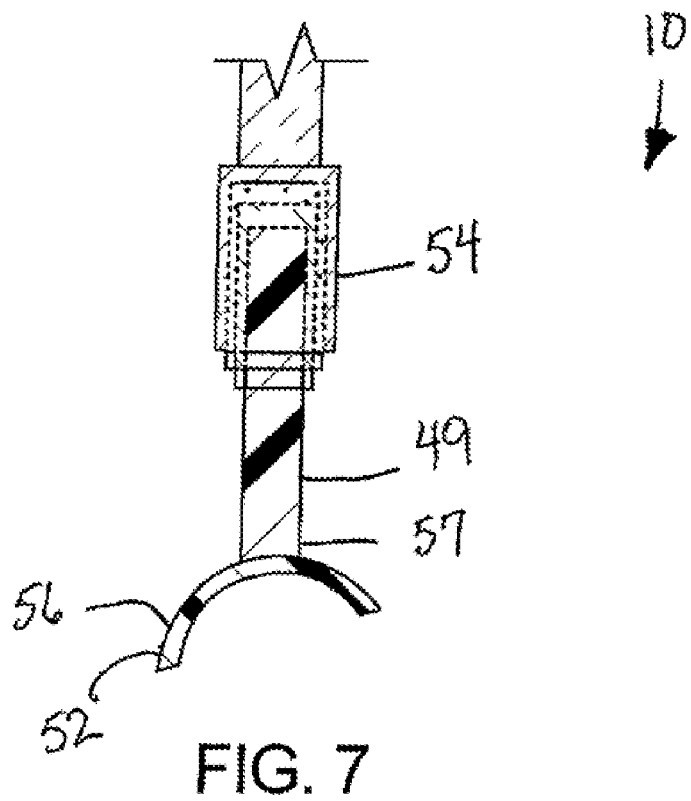
FIG. 7 is a cross sectional view of the clamping arms shown in FIG. 5 taken along line 7—7.
Figure 8:
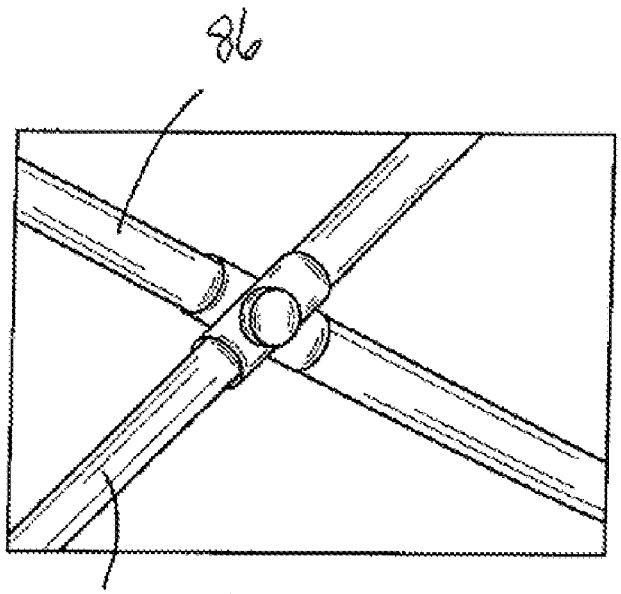
FIG. 8 is an expanded perspective view of the assembly shown in FIG. 1 showing the first beam and the U-shaped pole in a raised position.
Figure 9:
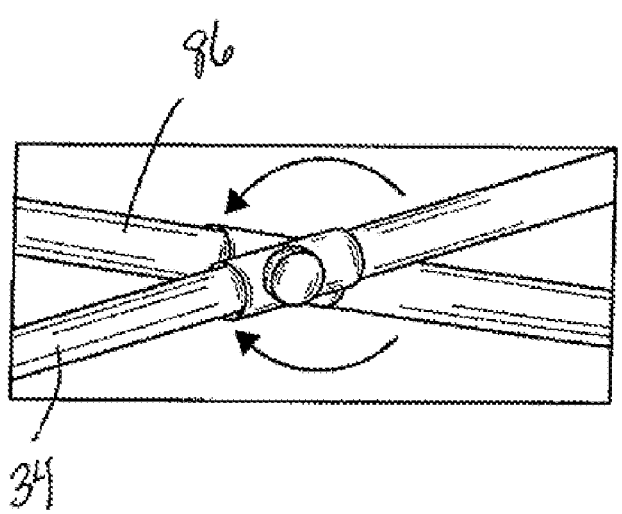
FIG. 9 is an expanded perspective view of the assembly shown in FIG. 8 in a partially collapsed position.

Referring to FIG. 3, first 75A and second 75B modified detents are employed on each side of the handle 37 and are removably engaged directly, without the use of intervening elements, with first 76A and second 76B sleeves positioned about the opposed ends 38 of the handle 37. In particular, each detent 75A, 75B conveniently includes a central shaft 77 and a deformably resilient spring member 78 advantageously interfitted therethrough. Each spring member 78 effectively traverses through a longitudinal length of the respective central shaft 77 and is critically aligned with an outer edge 83 of the sleeve 76A, 76B associated therewith. Of course, such spring members 78 can be produced in a variety of sizes, as is obvious to a person of ordinary skill in the art.

A pair of linear cams 79A, 79B are directly mated to top 81 and bottom 83 ends of the spring member 78, without the use of intervening elements, which is essential such that the user can advantageously compress the cams 79A, 79B inwardly with one hand while effectively maintaining their second hand on the handle 37. Each sleeve 76A, 76B conveniently includes a pair of notches 82A, 82B formed along the outer edge 79 thereof. Such notches 82A, 82B are suitably sized and shaped for receiving the cams 79A, 79B therein and maintaining the cams 79A, 79B at a fixed position. Of course, such notches can be formed in a variety of sizes and shapes, as is obvious to a person of ordinary skill in the art. The modified detents 75A, 75B of the present invention are critically and inherently necessary for providing the unexpected benefit of allowing the user to quickly and efficiently toggle the cams 79A, 79B between engaged and disengaged positions while continuously maintaining one hand on the handle 37. Such an advantage overcomes prior art shortcomings of requiring the user to stop the cart 10 and remove their hands from the cart's handle 37 while articulating the handle 37 to a folded position.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A cargo-transporting cart for assisting a caregiver to simultaneously maneuver a baby stroller while carrying a variety of objects within said cart during operating conditions, said cart comprising:
   a frame including
      a rigid base section horizontally registered above a ground level and oriented parallel thereto,
      a plurality of casters permanently mated directly to opposed corners of said base section, and
      a collapsible upper section pivotally conjoined directly to said opposed corners of said base section, said collapsible upper section being manually offset along a vertical plane such that said upper section becomes adapted between collapsed and raised positions while said base section maintains a static spatial relationship with the ground level;
   a collection bin centrally housed within said upper section and seated directly on said base section, said bin being arranged in such a manner that said upper section directly abuts proximal and distal top ends of said bin so that said bin remains statically anchored on said base section during transport; and
   a plurality of clamping arms directly anchored to a distal end of said base section and spaced from said upper section respectively, said clamping arms being hingedly pivotal along a first arcuate path such that distal ends of said anchor arms rise and fail above the horizontal plane of said base section;
   wherein said upper section and said clamping arms are simultaneously and independently articulated during transport.

2. The cart of claim 1, wherein said base section comprises:
   first and second pairs of elongated shafts extending along longitudinal and latitudinal edges of said frame;
   a plurality of brackets seated at said opposed corners of said base section, each of said brackets being directly and permanently mated to corresponding ones of said first and second pairs of shafts such that said first and second pairs of shafts defines a perimeter of said base section; and
   a plurality of support rods criss-crossing along a center of said base section and directly mated to said first and second pairs of shafts respectively, said support rods being spaced from said brackets.

3. The cart of claim 1, wherein said upper section comprises:
   first and second substantially L-shaped levers directly and statically coupled to distal ones of said brackets respectively; and
   first and second telescopically adaptable tubular beams having lower ends directly and pivotally mated to said first and second levers, said first and second beams traveling proximally and upwardly along opposed edges of said frame when said upper section is adapted to the raised position.

4. The cart of claim 1, wherein said upper section further comprises:
   a substantially U-shaped handle having laterally opposed ends telescopically and pivotally conjoined directly to upper ends of said first and second beams respectively, said handle being selectively articulated along a second arcuate path traveling along a longitudinal length of said frame such that said handle folds over a proximal end of said upper frame and becomes distally positioned away from an unfolded position; and
   a U-shaped pole having laterally opposed ends directly mated to proximal ones of said brackets, said pole traveling distally and upwardly from a proximal end of said frame wherein a distal end of said pole wraps about said distal top end of said bin so that said bin is prohibited from being displaced beyond a distal end of said upper section.

5. The cart of claim 1, wherein each of said clamping arms comprises:
   a bracket directly connected to said distal end of said base section;
   a telescopic shaft having a proximal end pivotally coupled to said bracket; and
   a C-shaped clamp directly and statically coupled to a distal end of said shaft;
   wherein said clamp is removably attached to the baby stroller in such a manner that said baby stroller maintains a fixed spatial relationship with said cart during transport.

6. A cargo-transporting cart for assisting a caregiver to simultaneously maneuver a baby stroller while carrying a variety of objects within said cart during operating conditions, said cart comprising:
   a frame including
      a rigid base section horizontally registered above a ground level and oriented parallel thereto,
      a plurality of casters permanently mated directly to opposed corners of said base section, and
      a collapsible upper section pivotally conjoined directly to said opposed corners of said base section, said collapsible upper section being manually offset along a vertical plane such that said upper section becomes adapted between collapsed and raised positions while said base section maintains a static spatial relationship with the ground level,
   wherein said upper section is spaced from said casters;
   a collection bin centrally housed within said upper section and seated directly on said base section, said bin being arranged in such a manner that said upper section directly abuts proximal and distal top ends of said bin so that said bin remains statically anchored on said base section during transport; and
   a plurality of clamping arms directly anchored to a distal end of said base section and spaced from said upper section respectively, said clamping arms being hingedly pivotal along a first arcuate path such that distal ends of said anchor arms rise and fail above the horizontal plane of said base section;
   wherein said upper section and said clamping arms are simultaneously and independently articulated during transport.

7. The cart of claim 6, wherein said base section comprises
   first and second pairs of elongated shafts extending along longitudinal and latitudinal edges of said frame;
   a plurality of brackets seated at said opposed corners of said base section, each of said brackets being directly and permanently mated to corresponding ones of said first and second pairs of shafts such that said first and second pairs of shafts defines a perimeter of said base section; and a plurality of support rods criss-crossing along a center of said base section and directly mated to said first and second pairs of shafts respectively, said support rods being spaced from said brackets.

8. The cart of claim 6, wherein said upper section comprises:

first and second substantially L-shaped levers directly and statically coupled to distal ones of said brackets respectively; and first and second telescopically adaptable tubular beams having lower ends directly and pivotally mated to said first and second levers, said first and second beams traveling proximally and upwardly along opposed edges of said frame when said upper section is adapted to the raised position.

9. The cart of claim 6, wherein said upper section further comprises:

a substantially U-shaped handle having laterally opposed ends telescopically and pivotally conjoined directly to upper ends of said first and second beams respectively, said handle being selectively articulated along a second arcuate path traveling along a longitudinal length of said frame such that said handle folds over a proximal end of said upper frame and becomes distally positioned away from an unfolded position; and a U-shaped pole having laterally opposed ends directly mated to proximal ones of said brackets, said pole traveling distally and upwardly from a proximal end of said frame wherein a distal end of said pole wraps about said distal top end of said bin so that said bin is prohibited from being displaced beyond a distal end of said upper section.

10. The cart of claim 6, wherein each of said clamping arms comprises:

a bracket directly connected to said distal end of said base section;

a telescopic shaft having a proximal end pivotally coupled to said bracket; and a C-shaped clamp directly and statically coupled to a distal end of said shaft;

wherein said clamp is removably attached to the baby stroller in such a manner that said baby stroller maintains a fixed spatial relationship with said cart during transport.

11. A cargo-transporting cart for assisting a caregiver to simultaneously maneuver a baby stroller while carrying a variety of objects within said cart during operating conditions, said cart comprising:

a frame including
a rigid base section horizontally registered above a ground level and oriented parallel thereto,
a plurality of casters permanently mated directly to opposed corners of said base section, and
a collapsible upper section pivotally conjoined directly to said opposed corners of said base section, said collapsible upper section being manually offset along a vertical plane such that said upper section becomes adapted between collapsed and raised positions while said base section maintains a static spatial relationship with the ground level,
wherein said upper section lays substantially parallel to said base section when said upper section is articulated to the collapsed position, wherein said upper section is spaced from said casters;

a collection bin centrally housed within said upper section and seated directly on said base section, said bin being arranged in such a manner that said upper section directly abuts proximal and distal top ends of said bin so that said bin remains statically anchored on said base section during transport; and a plurality of clamping arms directly anchored to a distal end of said base section and spaced from said upper section respectively, said clamping arms being hingedly pivotal along a first arcuate path such that distal ends of said anchor arms rise and fall above the horizontal plane of said base section;

wherein said upper section and said clamping arms are simultaneously and independently articulated during transport.

12. The cart of claim 11, wherein said base section comprises:

first and second pairs of elongated shafts extending along longitudinal and latitudinal edges of said frame;

a plurality of brackets seated at said opposed corners of said base section, each of said brackets being directly and permanently mated to corresponding ones of said first and second pairs of shafts such that said first and second pairs of shafts defines a perimeter of said base section; and a plurality of support rods criss-crossing along a center of said base section and directly mated to said first and second pairs of shafts respectively, said support rods being spaced from said brackets.

13. The cart of claim 11, wherein said upper section comprises:

first and second substantially L-shaped levers directly and statically coupled to distal ones of said brackets respectively; and first and second telescopically adaptable tubular beams having lower ends directly and pivotally mated to said first and second levers, said first and second beams traveling proximally and upwardly along opposed edges of said frame when said upper section is adapted to the raised position.

14. The cart of claim 11, wherein said upper section further comprises:

a substantially U-shaped handle having laterally opposed ends telescopically and pivotally conjoined directly to upper ends of said first and second beams respectively, said handle being selectively articulated along a second arcuate path traveling along a longitudinal length of said frame such that said handle folds over a proximal end of said upper frame and becomes distally positioned away from an unfolded position; and a U-shaped pole having laterally opposed ends directly mated to proximal ones of said brackets, said pole traveling distally and upwardly from a proximal end of said frame wherein a distal end of said pole wraps about said distal top end of said bin so that said bin is prohibited from being displaced beyond a distal end of said upper section.

15. The cart of claim 11, wherein each of said clamping arms comprises:

a bracket directly connected to said distal end of said base section;

a telescopic shaft having a proximal end pivotally coupled to said bracket; and a C-shaped clamp directly and statically coupled to a distal end of said shaft;

wherein said clamp is removably attached to the baby stroller in such a manner that said baby stroller maintains a fixed spatial relationship with said cart during transport.

* * * * *